June 28, 1927.
C. H. FRANKS
ELECTRICAL COIL
Filed Dec. 22, 1925
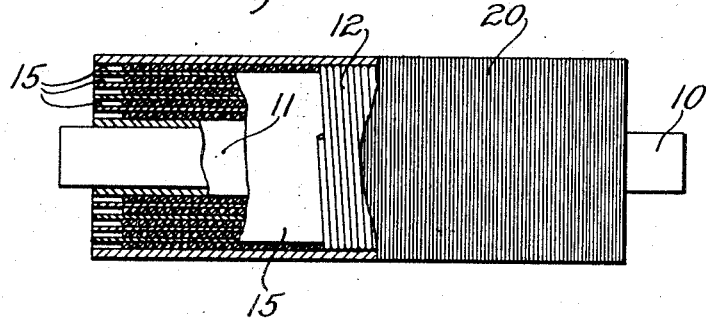
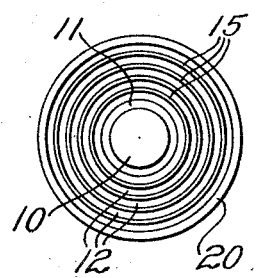
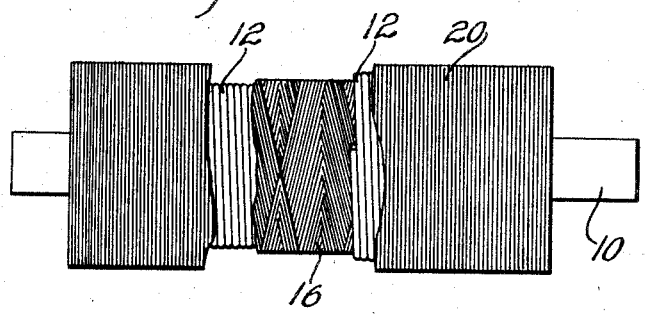
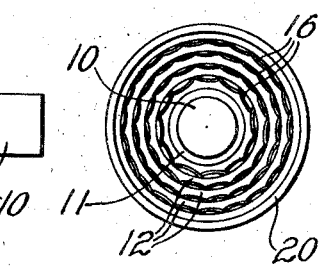
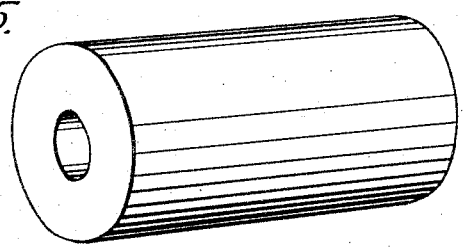
Inventor
Clem H. Franks
by *H. A. Tatum*
Att'y.

Patented June 28, 1927.

1,633,577

UNITED STATES PATENT OFFICE.

CLEM H. FRANKS, OF LA GRANGE, ILLINOIS, ASSIGNOR TO WESTERN ELECTRIC COMPANY INCORPORATED, OF NEW YORK, N. Y., A CORPORATION OF NEW YORK.

ELECTRICAL COIL.

Application filed December 22, 1925. Serial No. 76,956.

This invention relates to electrical coils having protective coatings and to methods of producing such coils.

The principal object of the present invention is the production of electrical coils in a manner to render them impervious to moisture.

My copending application, Serial No. 52,697, filed August 26, 1925, covers a protecting coating and its method of application to electrical coils and the like to render them impervious to moisture and the present invention represents an improvement or modified form thereof. Reference is made to my copending application for a more detailed disclosure of such a protective coating.

To accomplish the present invention according to one embodiment thereof, the core member on which the coil is to be wound is covered with a cellulose material and the electrical conductor is then wound thereon in the form of layers of adjacent helices. Cellulose material is introduced intermediate the successive layers of helices so that it projects beyond the edges of the successive layers, and is also applied over the outer layer, preferably in the form of a wrapping of strands thereof. The entire coil is then subjected to a solvent for the cellulose material to cause a coalescing of the adjacent portions of the cellulose material, thus producing a continuous imperforate envelope of cellulose material completely surrounding the conductor portion of the coil.

The method of constructing electrical coils, which will be clear from the following description, is of particular advantage in the production of so-called self-sustaining coils or coils which have no sustaining core or spool heads.

Further details of the invention will be pointed out in the following detailed description taken in connection with the accompanying drawings, in which Fig. 1 is a view in elevation of an electrical coil produced according to the present invention, portions thereof being cut away to more clearly disclose the features thereof;

Fig. 2 is an end view of the coil structure shown in Fig. 1;

Fig. 3 is a view in elevation of a modified type of electrical coil produced according to the present invention, a part of this view also being broken away to indicate the details of this construction;

Fig. 4 is an end view of the coil structure shown in Fig. 3, and

Fig. 5 is a view in perspective of one type of coil produced according to the present invention.

My copending application referred to above describes the production of an imperforate protective coating wherein strands of cellulose material are arranged adjacent to each other and then subjected to a solvent to coalesce the adjacent strands to produce an imperforate structure, the solvent being subsequently removed to leave a dry solid body of cellulose material. This principle of causing a flowing together of adjacent portions of cellulose material is employed in the practice of the present invention. The coil is preliminarily wound and then subjected to a solvent for the portions of cellulose material to produce the finished article.

Referring now to the accompanying drawings, a core member 10 which may be the arbor or mandrel of a winding machine is covered with cellulose material 11 in any suitable form, and an electrical conductor in the form of a layer 12 of closely adjacent helices is applied over the cellulose material 11. Over the thus arranged turns of the conductor 12 a layer of cellulose material is then placed either in sheet form represented by the numeral 15 in Fig. 1, or as represented by the numeral 16 in Fig. 3 as a layer of strands in that form termed a universal winding wherein strands are served at various angles so as to become interlaced at the ends of the coil. The coil is built up by applying sequentially a layer of helices of the conductor and a layer of cellulose material in any suitable form until a coil of the desired size and electrical characteristics is produced. Obviously, the conductor and the cellulose material may be arranged in various other ways without departing from the spirit of the present invention, but according to the preferred form of the invention sufficient cellulose material projects from each end of the coil to allow for the formation of a solid coating. When the coil has been built up to the proper size, cellulose material 20, preferably in strand form, is applied over the outermost layer of helices of the conductor in the manner disclosed in Figs. 1 and 3.

After the coil has been wound it is subjected to a solvent for the cellulose material in any suitable manner, such as by spraying, subjecting the coil to the solvent vapor or in any of the other ways suggested in my copending application referred to above. This treatment has the effect of partially dissolving the cellulose material and causing it to coalesce or flow together to produce a continuous solid portion of cellulose material on the outside of the coil. When the sheet cellulose material is employed between the layers of the conductor, the projecting portions of the sheets become partially dissolved and lie flat against the end of the coil and become cemented together, and the subsequent evaporation leaves them in this condition.

When a coreless coil is being produced, the core member or mandrel 10 may be withdrawn from the completed coil, either before or after the subjection of the coil to the solvent. When a coil having a core is being produced, it is obvious that best results will be obtained by winding the coil on the core itself and not on the core member or mandrel such as shown in the drawing. When the cellulose material 11 is in strand form it may be subjected to a slight solvent action before the winding operation in order to make it more self-sustaining when the core or mandrel 10 is removed. The portion 11, however, is preferably sheet cellulose material, in which case it will be formed into a hollow core thereof. When a so-called paper core coil is produced, the core 10 may take the form of a cylinder of cardboard in which case the solvent for the cellulose material will be effective through the cardboard so that it will not be necessary to treat the material 11 before winding the core thereon. After the coil has been subjected to the solvent and the core 10 removed, it will present the appearance as shown in Fig. 5. As shown in this figure, the conductor portion is entirely surrounded by an envelope of cellulose material.

In order to prevent undue shrinkage of the protective coating produced in the practice of the invention, any suitable provision may be resorted to. For instance, as described in my copending application, the cellulose material may be treated before its application to the coil with an oil solution or any material which will retard the hardening of the cellulose material. Another method is to incorporate a small amount of a similar agent with the solvent, suitable materials for use in this manner being any of the plasticizers for the cellulose material, such as furfural.

The cellulose material employed in the practice of the invention may be in strand or sheet form or in fact in any form in which it can be conveniently applied. Where the sheet material is used either cellulose nitrate or cellulose acetate or other type of cellulose derivative may be used, but cellulose acetate on account of its relatively less inflammability, is preferable.

The type of fiber or strand employed may be any fiber or strand of a cellulose nature, such as the cellulose derivatives, which may be treated with a solvent to produce the effect desired. Examples of such materials are the strands of artificial silk which are made up of a plurality of synthetic filaments or "ends". These strands may be employed for practicing the invention without any additional treatment. Strands of natural vegetable or animal fibers, such as cotton or silk threads, may be employed but they must be impregnated with a cellulose derivative, such as nitro-cellulose or cellulose acetate, before they are in condition for use.

The solvent employed may be any of the well known solvents for the cellulose derivatives. Acetone, however, is preferred because this material is a good solvent for both cellulose acetate and cellulose nitrate and is easily handled. Other solvents, however, which may be employed are a mixture of ether and alcohol, tetrachloralethane, ethyl-acetate, diacetone alcohol, methylethyleketon or benzol acetate. In addition to true solvents, partial solvents or so-called "plasticizers" may be employed, such as furfural.

The term "cellulose material" is used in the appended claims to refer to a cellulose derivative in sheet form or to either fibers or strands composed entirely or partially of synthetic filaments or to natural fibers or strands impregnated with a cellulose derivative, and the term "solvent" as employed in the appended claims, is intended to include "plasticizers" as well as true solvents.

What is claimed is:

1. A method of producing electrical coils, which consists in arranging alternate layers of cellulose material and turns of an electrical conductor, and treating the cellulose material to coalesce the material and thereby cause the formation of an imperforate coating for the coiled conductor.

2. A method of producing electrical coils, which consists in arranging alternate layers of cellulose material and turns of an electrical conductor, allowing a portion of the cellulose material to extend beyond the turns of the electrical conductor, and treating the cellulose material with a solvent therefore to coalesce the material and thereby cause the formation of an imperforate coating completely enveloping the coiled conductor.

3. A method of producing an electrical coil, which consists in applying cellulose material to a core member, applying an electrical conductor to the cellulose material in the form of a layer of helices, applying cellulose material over the layer of helices so that it projects from the edges thereof, and subjecting the resulting article to a solvent for the cellulose material to coalesce adjacent portions thereof.

4. A method of producing an electrical coil, which consists in forming a cylinder of cellulose material, placing an electrical conductor in the form of a plurality of layers of closely adjacent helices around the cylinder of cellulose material, applying cellulose material intermediate the layers of helices so that portions of the cellulose material project beyond the ends of the layers of helices, applying callulose material over the outside layer of helices, and subjecting the resulting coil to a solvent for the cellulose material to coalesce adjacent portions thereof.

5. A method of producing an electrical coil, which consists in forming a cylinder of cellulose material, winding an electrical conductor around the cylinder, associating a cellulose material with the conductor so that portions of the cellulose material project beyond the ends of the coil, applying a layer of cellulose material on the outside of the coil, and then subjecting the formed coil to a solvent for the cellulose material to coalesce adjacent portions thereof.

6. The method of producing an electrical coil comprising a plurality of layers of helices of an electrical conductor, which consists in applying cellulose material between the layers so that portions of the cellulose material are exposed at the ends thereof, and subjecting the exposed cellulose material to a solvent therefor to coalesce adjacent portions thereof.

7. An electrical coil comprising a core member of cellulose material, an electrical conductor in coil form around the core member, and cellulose material associated with and surrounding the outside of the coiled conductor, the cellulose material being coalesced to form an envelope completely surrounding the coiled conductor.

8. An electrical coil comprising a core member, a conductor in the form of layers of helices surrounding the conductor, and cellulose material around the outermost layer of helices and intermediate the layers of helices, the cellulose material between the layers projecting from the ends thereof, adjacent portions of the cellulose material being coalesced to form a continuous coating on the ends and extending around the outside of the coil.

9. An electrical coil comprising a core member formed of sheet cellulose material, a conductor in the form of layers of helices around the core member, and sheet cellulose material interposed between the layers of helices and projecting therefrom, and cellulose material around the outermost layer of helices, the cellulose material of the core, that projecting from between the layers of helices and that surrounding the outermost layer of helices being coalesced to form a continuous envelope of imperforate cellulose material surrounding the coiled conductor.

In witness whereof, I hereunto subscribe my name this 10th day of December A. D., 1925.

CLEM H. FRANKS.